(12) United States Patent
Sanada

(10) Patent No.: US 10,893,552 B2
(45) Date of Patent: Jan. 12, 2021

(54) PROJECTOR HAVING WIRELESS LAN TERMINAL FUNCTION, METHOD FOR WIRELESS LAN CONNECTION OF SAID PROJECTOR, AND PROJECTION SYSTEM

(71) Applicant: NEC Display Solutions, Ltd., Tokyo (JP)

(72) Inventor: Kenji Sanada, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 177 days.

(21) Appl. No.: 16/093,942

(22) PCT Filed: Jun. 9, 2016

(86) PCT No.: PCT/JP2016/067180
§ 371 (c)(1),
(2) Date: Oct. 15, 2018

(87) PCT Pub. No.: WO2017/212602
PCT Pub. Date: Dec. 14, 2017

(65) Prior Publication Data
US 2019/0116620 A1 Apr. 18, 2019

(51) Int. Cl.
*H04W 76/10* (2018.01)
*H04W 84/12* (2009.01)
(Continued)

(52) U.S. Cl.
CPC ........... *H04W 76/10* (2018.02); *H04W 48/16* (2013.01); *H04W 84/12* (2013.01); *G03B 21/14* (2013.01); *G03B 2206/00* (2013.01)

(58) Field of Classification Search
CPC ..... H04W 48/12; H04W 8/005; H04W 48/20; H04W 76/10; H04W 48/14; H04W 48/16;
(Continued)

(56) References Cited

U.S. PATENT DOCUMENTS

2005/0036509 A1* 2/2005 Acharya ............ H04N 21/4753
370/466

FOREIGN PATENT DOCUMENTS

JP 2005-202754 A 7/2005
JP 2006-261938 A 9/2006
(Continued)

OTHER PUBLICATIONS

Japanese Office Action, dated Nov. 5, 2019, in Japanese Application No. 2018-522249 and English Translation thereof.
(Continued)

*Primary Examiner* — Natasha W Cosme
(74) *Attorney, Agent, or Firm* — McGinn I.P. Law Group, PLLC.

(57) ABSTRACT

The present invention provides a method for establishing a connection path by way of a wireless LAN path of a projector and a wireless LAN terminal even when the operating mode is switched. The method establishes a wireless LAN connection between a wireless LAN terminal and a projector that can operate as an access point apparatus or a client apparatus of a wireless LAN. The projector projects connection information that indicates SSID, the wireless LAN terminal receives the connection information as input by way of a provided input unit, and further, operates as an access point apparatus. The projector detects the wireless LAN terminal that is operating as an access point device by means of a site survey, and the projector then connects to the wireless LAN terminal as a client apparatus.

20 Claims, 10 Drawing Sheets

(51) Int. Cl.
*H04W 48/16* (2009.01)
*G03B 21/14* (2006.01)

(58) Field of Classification Search
CPC ..... H04W 84/12; H04W 84/18; H04W 12/06; H04W 48/10; H04W 76/11; H04L 41/0853
See application file for complete search history.

(56) References Cited

FOREIGN PATENT DOCUMENTS

| | | |
|---|---|---|
| JP | 2006-352188 A | 12/2006 |
| JP | 2007-288487 A | 11/2007 |
| JP | 2008-015402 A | 1/2008 |
| JP | 2010-187168 A | 8/2010 |
| JP | 2010-193238 A | 9/2010 |
| JP | 2013-222991 A | 10/2013 |
| JP | 2014-216736 A | 11/2014 |

OTHER PUBLICATIONS

International Search Report (ISR) (PCT Form PCT/ISA/210), in PCT/JP2016/067180, dated Jul. 19, 2016.

\* cited by examiner

PROJECTOR HAVING WIRELESS LAN TERMINAL FUNCTION, METHOD FOR WIRELESS LAN CONNECTION OF SAID PROJECTOR, AND PROJECTION SYSTEM

TECHNICAL FIELD

The present invention relates to a projector having a wireless LAN terminal function that operates as an access point or as a client in a wireless LAN (Local Area Network), a wireless LAN connection method of the projector, and a projection system.

BACKGROUND ART

As shown in Patent Documents 1-4, projectors that have been proposed in recent years include devices that function as an access point apparatus or client apparatus that makes up a wireless LAN.

This type of projector operates in an access point mode and an infrastructure mode and functions as a wireless LAN access point apparatus at the time of the access point mode and functions as a wireless LAN client apparatus at the time of the infrastructure mode.

In the access point mode, the projector becomes a wireless LAN access point and waits for a connection from a wireless LAN client (wireless terminal). In the infrastructure mode, the projector becomes a wireless LAN client and connects to a neighboring wireless LAN access point.

Methods that can be considered for switching the wireless LAN operating mode of a projector include, in addition to implementation by a wireless LAN terminal that can communicate with the projector, switching realized by remote wireless control by infrared remote control, switching that employs a wired control path (a wired LAN, serial control interface, or parallel control interface), or switching implemented directly by a user that inputs instructions on a control panel provided in the projector.

LITERATURE OF THE PRIOR ART

Patent Documents

Patent Document 1: Japanese Unexamined Patent Application Publication No. 2014-216736
Patent Document 2: Japanese Unexamined Patent Application Publication No. 2010-193238
Patent Document 3: Japanese Unexamined Patent Application Publication No. 2006-352188
Patent Document 4: Japanese Unexamined Patent Application Publication No. 2005-202754

SUMMARY OF THE INVENTION

Problem to be Solved by the Invention

Methods of installing a projector include floor installation such as placement on a desk and hanging installation such as hanging from the ceiling.

When a projector is installed by hanging, a user will encounter difficulties in directly performing instruction input to the control panel provided on the projector. In addition, reception of infrared remote control is made difficult by the installation environment, and the cable control paths provided in the projector cannot be used. Still further, inexpensive projectors sometimes lack the remote control or the cable control path functions themselves.

As a result, switching the operating mode of the wireless LAN of a projector by communication realized by the wireless LAN terminal that, with the projector, constitutes the wireless LAN is of key importance. When switching the operating mode of the wireless LAN of a projector from a wireless LAN terminal, the user must carry out input at the wireless LAN terminal that accords with the current operating mode of the projector.

When a projector is operating in the access point mode, the user must apply the SSID (Service Set Identifier) of the access point of the projector, the security key, and the IP (Internet Protocol) address of the projector as input to the wireless LAN terminal.

When the projector is operating in the infrastructure mode, the user must apply as input to the wireless LAN terminal the SSID of the access point of the network that is connected to the projector, the Security key, and the IP address of the projector.

By applying input that accords with the current operating mode of the wireless LAN of the projector, the user makes the projector controllable by the wireless LAN path and then switches the operating mode of the wireless LAN of the projector.

When using a wireless LAN to switch the operating mode, the user switches to a new operating mode that accords with the wireless LAN settings that are applied as input, and communication of the wireless LAN that was connected up to that point is cut off. When the wireless LAN settings carried out by the user are in error at this time, the connection path realized by the wireless LAN that follows switching of the operating mode is not established, and the projector cannot be controlled by communication realized by the wireless LAN.

The present invention realizes a projector having a wireless LAN terminal function that can establish a connection path by the wireless LAN path of a projector and a wireless LAN terminal even when the operating mode has been switched, and further, realizes a wireless LAN connection method of the projector and a projection system.

Means for Solving the Problem

The wireless LAN connection method of the present invention is a wireless LAN connection method of a wireless LAN terminal and a projector that can operate as a wireless LAN access point apparatus or as a client apparatus and includes steps of:
the projector projecting connection information that indicates SSID;
the wireless LAN terminal receiving as input the connection information in a provided input unit, and further, operating as an access point apparatus;
the projector detecting the wireless LAN terminal that is operating as an access point apparatus by means of a site survey; and
the projector connecting as a client apparatus to the wireless LAN terminal.

The projection system of the present invention is a projection system made up from a projector that can operate as a wireless LAN access point apparatus or as a client apparatus and a wireless LAN terminal;
the projector being provided with:
a picture signal generation unit that generates a picture signal that displays connection information that indicates SSID; and a site survey processing unit that searches for access points in the vicinity; and the wireless LAN terminal being provided with an input unit;

wherein:

the wireless LAN terminal, upon receiving the connection information as input in the input unit, operates as an access point apparatus of the SSID indicated in the connection information; and the projector, upon detecting the wireless LAN terminal that is operating as an access point apparatus by means of the site survey processing unit, connects to the wireless LAN terminal as a client apparatus.

The projector of the present invention is a projector that, together with a wireless LAN terminal that can operate as a wireless LAN access point apparatus or as a client apparatus, constitutes a projection system and is provided with:

a picture signal generation unit that generates a picture signal that displays connection information that indicates SSID; and a site survey processing unit that searches for access points in the vicinity;

wherein, upon detection of the wireless LAN terminal that is operating as an access point apparatus by means of the site survey processing unit, the projector connects with the wireless LAN terminal as a client apparatus.

Effect of the Invention

In the present invention that is provided with the above-described configuration, a connection path is established by the wireless LAN path of a projector and a wireless LAN terminal even when the operating mode is switched.

BEST MODE FOR CARRYING OUT THE INVENTION

Exemplary embodiments of the present invention are next described with reference to the accompanying drawings.

First Exemplary Embodiment

Figure 1:
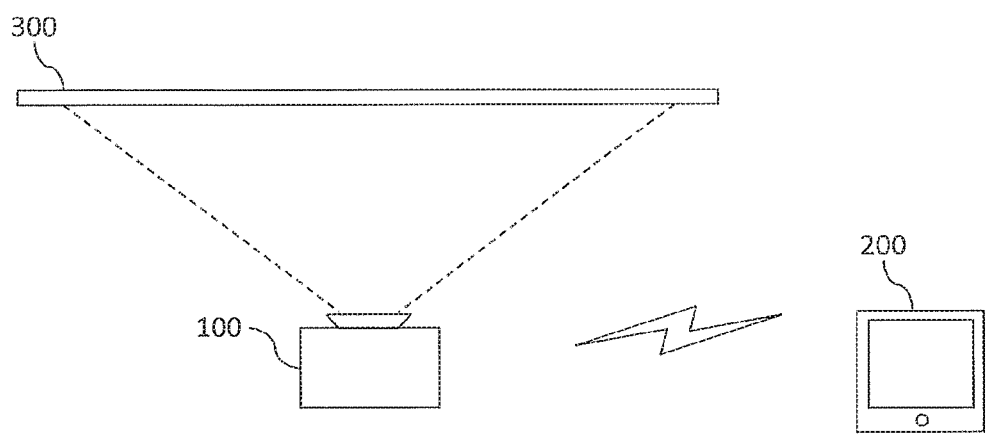
FIG. 1 is a block diagram showing the configuration of an exemplary embodiment of the projection system according to the present invention.

FIG. 1 is a block diagram showing the configuration of an exemplary embodiment of a projection system according to the present invention.

The projection system of the present exemplary embodiment is made up from: projector 100, and wireless LAN terminal 200. Projector 100 projects a picture that accords with data that are sent from wireless LAN terminal 200 upon a projection surface such as screen 300 shown in the figure or a wall.

Figure 2:
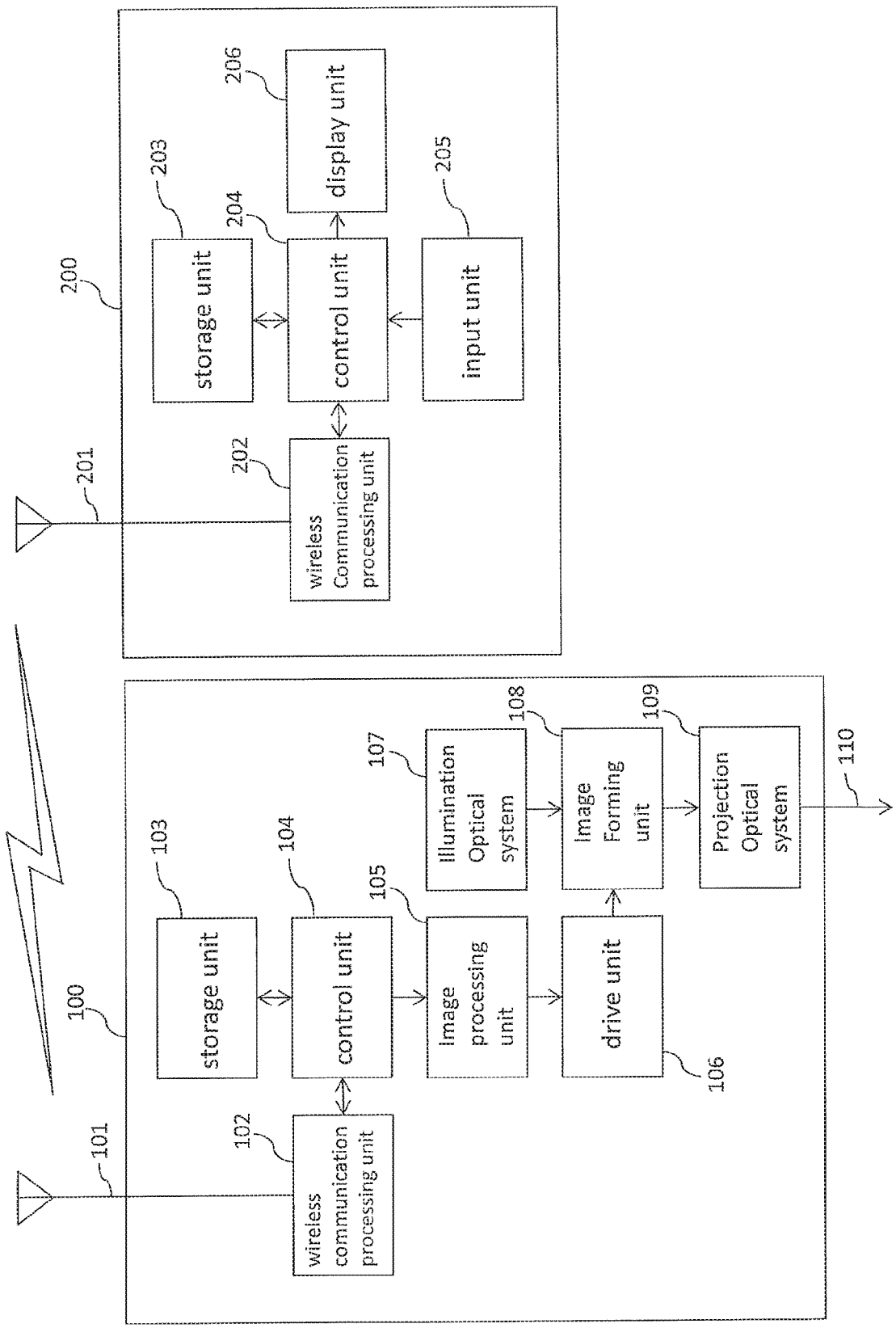
FIG. 2 is a block diagram showing the configuration of projector 100 and wireless LAN terminal 200.

FIG. 2 is a block diagram showing the configuration of projector 100 and wireless LAN terminal 200.

Projector 100 is provided with antenna 101, wireless communication processing unit 102, storage unit 103, control unit 104, image processing unit 105, drive unit 106, illumination optical system 107, image forming unit 108, and projection optical system 109. Wireless LAN terminal 200 is provided with antenna 201, wireless communication processing unit 202, storage unit 203, control unit 204, input unit 205, and display unit 206.

The configuration and operation of projector 100 will first be described.

Image processing unit 105, drive unit 106, illumination optical system 107, image forming unit 108, and projection optical system 109 are components provided in typical projectors and project a picture on the basis of image data that have been sent in from wireless LAN terminal 200 by way of antenna 101, wireless communication processing unit 102, and control unit 104.

Image processing unit 105 generates an image signal in which the contrast and sharpness shown in image data are realized and supplies the image signal to drive unit 106. Drive unit 106 controls the operation of image forming unit 108 on the basis of the image signal, and the illumination light from illumination optical system 107 becomes image light that is modulated in accordance with the image signal, this light being enlarged and projected as projection light 110 by projection optical system 109. A DMD (Digital Micromirror Device) or liquid crystal display element can be used as image forming unit 108. Further, a laser diode or LED (Light-Emitting Diode) can be used as the light source of the illumination optical system, or a component in which are combined phosphors that take these light sources as excitation light can be used.

Figure 3:
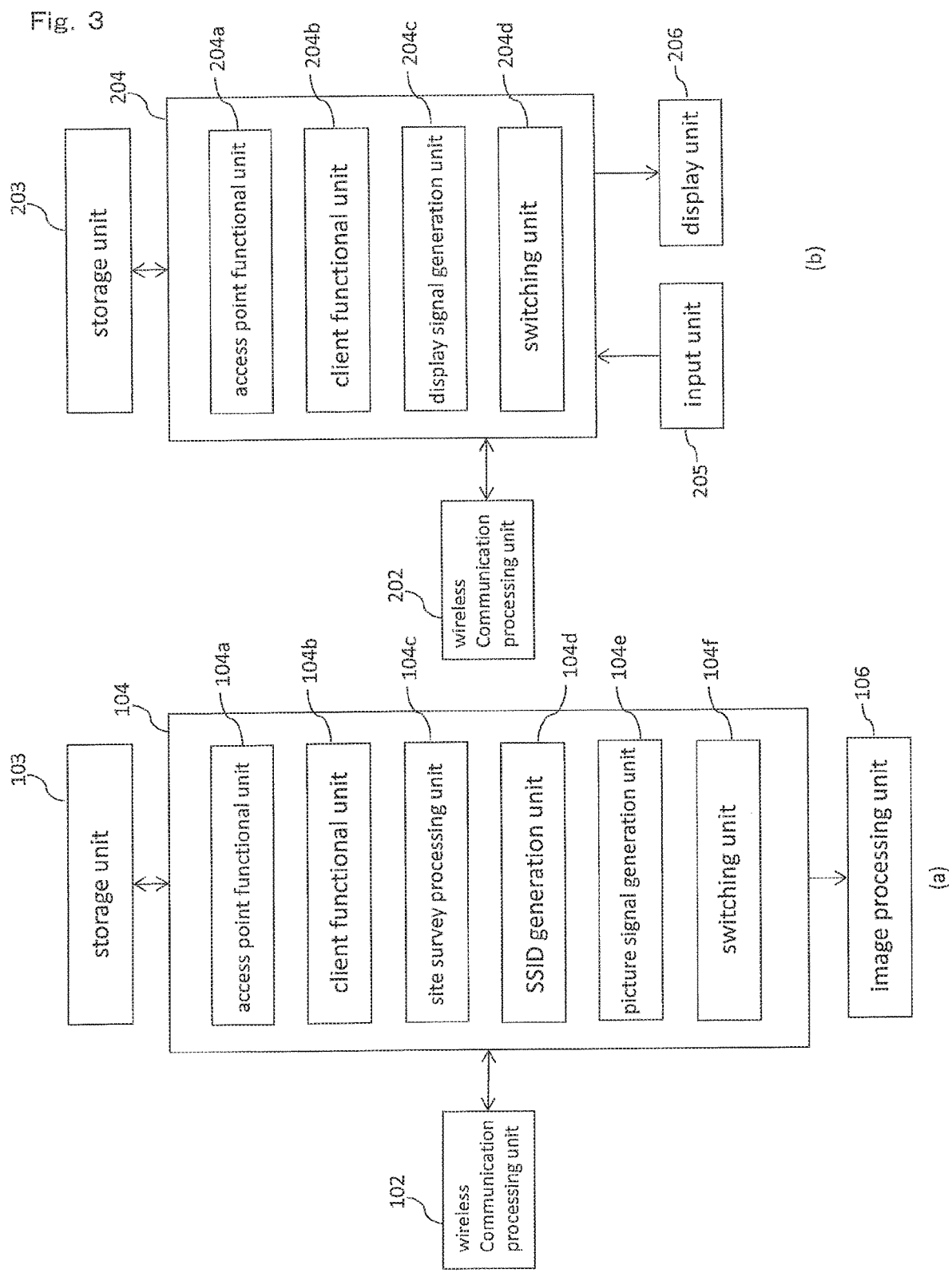
FIG. 3(a) is a block diagram showing the configuration of control unit 104.
FIG. 3(b) is a block diagram showing the configuration of control unit 204.

FIG. 3(a) is a block diagram showing the configuration of control unit 104. Control unit 104 is provided with, in addition to typical control functions, access point functional unit 104a, client functional unit 104b, site survey processing unit 104c, SSID generation unit 104d, picture signal generation unit 104e, and switching unit 104f.

Access point functional unit 104a carries out processing when projector 100 is functioning as an access point apparatus in a wireless LAN (access point mode), and client functional unit 104b carries out processing when projector 100 is functioning as a client apparatus in a wireless LAN (infrastructure mode).

Site survey processing unit 104c carries out a site survey to execute a search of neighboring access points of a wireless LAN. A site survey here refers to an investigation of the state of electromagnetic waves of the surrounding wireless LAN, and by means of this investigation, the SSID or radio field intensity of access points that are present in the vicinity can be found.

SSID generation unit 104d generates SSID that differs from the SSID of access points of the surrounding wireless LAN from the search results that were obtained by the site survey of site survey processing unit 104c. Regarding the generation of this SSID, one method that can be offered involves generating the SSID based on the MAC address (Media Access Control Address) of the wireless LAN of projector 100.

Picture signal generation unit 104e generates an image signal that projects the SSID that was generated in SSID generation unit 104d. This projection of the SSID may be in a format that is superposed on the picture that is being projected or may be displayed alone.

Switching unit 104f performs switching to cause operation of any of the above-described parts according to input content from wireless LAN terminal 200 that is received as input by way of antenna 101 and wireless communication processing unit 102.

Storage unit 103 is a component that stores programs for causing control unit 104 to operate, its own MAC address, and settings information that are determined in advance when projector 100 configures the wireless LAN, and switching unit 104f therefore causes the realization of the functions of each part of control unit 104 that is shown in FIG. 3(a) by reading various types of programs. Settings information includes its own SSID, security keys, and the security keys of wireless LAN terminal 200 that makes up the projection system.

The configuration and operation of wireless LAN terminal 200 are next described.

Input unit 205 is constructed using a touch panel, receives input from the user, and supplies the received input content to control unit 204. Examples of the input content to input unit 205 include SSID and settings input relating to the wireless LAN of projector 100.

Display unit 206 is constructed by, for example, a liquid crystal panel and displays images in accordance with a display signal that is sent in from control unit 204.

FIG. 3(b) is a block diagram that shows the configuration of control unit 204. Control unit 204 is provided with, in addition to typical control functions, access point functional unit 204a, client functional unit 204b, display signal generation unit 204c, and switching unit 204d.

Access point functional unit 204a carries out processing when wireless LAN terminal 200 is functioning as an access point apparatus in the wireless LAN, and client functional unit 204b carries out processing when wireless LAN terminal 200 is functioning as a client apparatus in the wireless LAN.

Display signal generation unit 204c generates a display signal that brings about the display of images on display unit 206 in accordance with information that is sent in from projector 100 by way of antenna 201 and wireless communication processing unit 202.

Switching unit 204d carries out switching to cause operation of any of the above-described parts in accordance with input content that is received from projector 100 by way of antenna 201 and wireless communication processing unit 202.

Storage unit 203 is a component that stores, for example, programs for causing control unit 204 to operate and the MAC address of projector 100 that makes up the projection system, and switching unit 204d, by reading various programs, brings about the realization of the functions of each part of control unit 204 shown in FIG. 3(b).

The operation of the present exemplary embodiment is next described while referring to the sequence diagrams of FIGS. 4 to 10. The sequence diagrams of FIGS. 4 to 10 show the operations of projector 100, wireless LAN terminal 200, and a user that uses the present exemplary embodiment.

Figure 4:
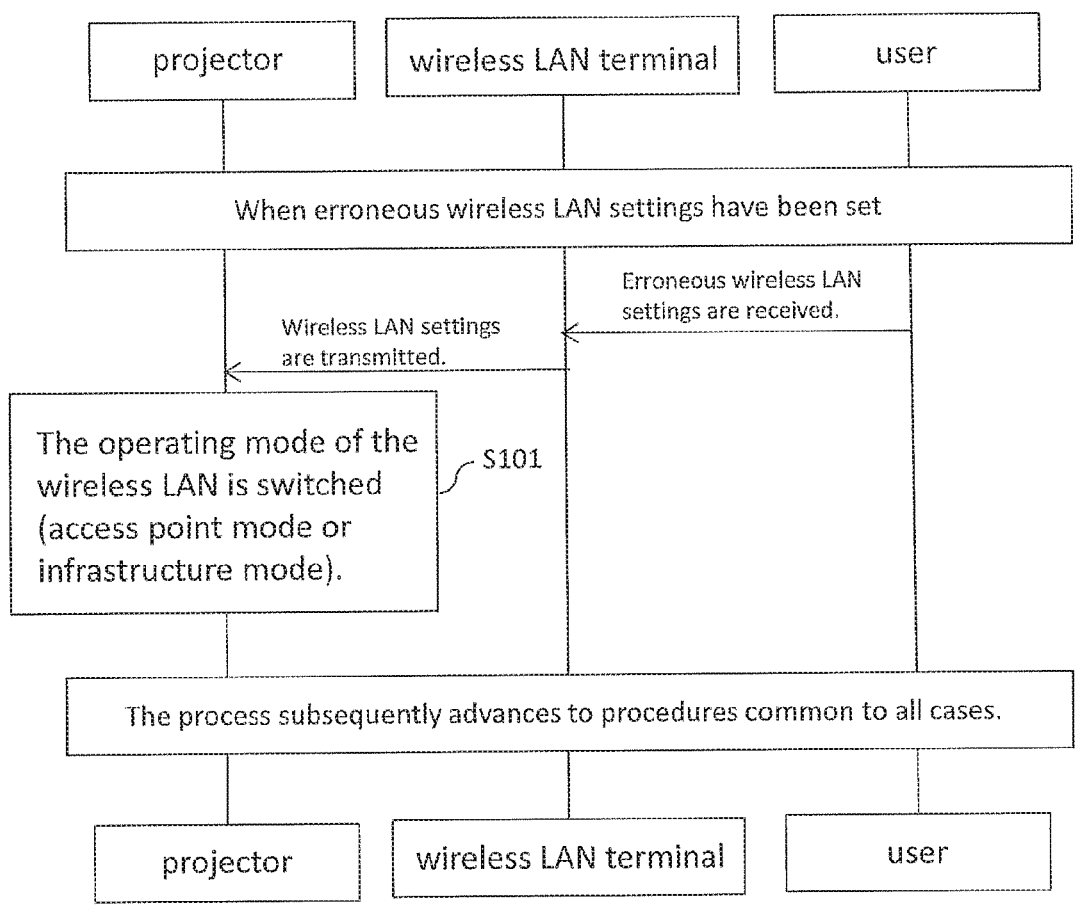
FIG. 4 is a sequence diagram showing the operation of each part when a user has set wireless LAN settings that are in error to wireless LAN terminal 200.
Figure 5:
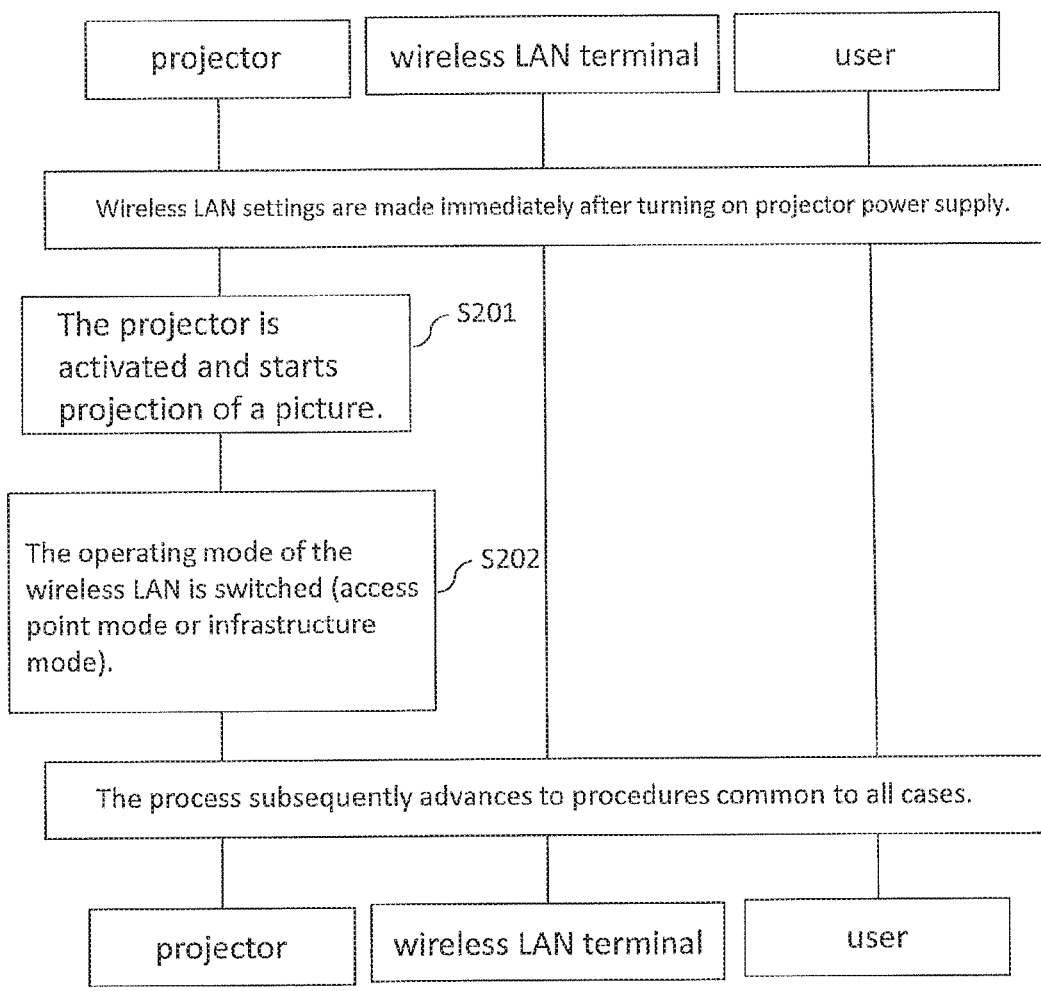
FIG. 5 is a sequence diagram showing the operation when wireless LAN settings are implemented immediately after turning ON the power supply to projector 100.

FIG. 4 shows the operation of each part when the user has made erroneous wireless LAN settings in wireless LAN terminal 200, and FIG. 5 shows the operation when settings of the wireless LAN are carried out immediately after the power supply of projector 100 is turned ON. In the event of any operation, the process later transitions to the common sequences shown in FIG. 6 and FIG. 7.

Explanation first regards the operation in the case shown in FIG. 4 in which the user has made erroneous settings of the wireless LAN in the wireless LAN terminal 200.

Taking the state at the start time, both projector 100 and wireless LAN terminal 200 are assumed to be in the activated state, and further, projector 100 projects a picture, and projector 100 and wireless LAN terminal 200 are connected by a wireless LAN path by way of antennas 101 and 201 and wireless communication processing units 102 and 202. If the user applies erroneous wireless LAN settings to input unit 205 of wireless LAN terminal 200 in this state, erroneous wireless LAN settings are transmitted from wireless LAN terminal 200 to projector 100.

In projector 100, switching of the operating mode of the wireless LAN is carried out in accordance with the erroneous wireless LAN settings that were transmitted from wireless LAN terminal 200 (Step S101) and the wireless LAN path of projector 100 and wireless LAN terminal 200 is cut off.

If the erroneous wireless LAN settings are settings that indicate functioning as an access point mode, switching unit 104f activates access point functional unit 104a, and projector 100 functions as an access point apparatus in the wireless LAN. On the other hand, if the erroneous wireless LAN settings are settings that indicate functioning as the infrastructure mode, switching unit 104f activates client functional unit 104b and projector 100 functions as a client apparatus in the wireless LAN.

Operation is next described for a case in which wireless LAN settings are carried out immediately after the power supply of projector 100 is turned ON as shown in FIG. 5.

Taking the state at the start time, the power supply of projector 100 is assumed to be turned OFF and wireless LAN terminal 200 is assumed to be in the activated state. As a matter of course, projector 100 and wireless LAN terminal 200 have entered a disconnected state in the wireless LAN.

Projector 100 starts the projection of a picture when the power supply is turned ON and projector 100 enters the activated state (Step S201). The picture projected here is, for example, an initial projection image that has been stored in advance in storage unit 103.

Projector 100 subsequently starts operation of the wireless LAN in the operating mode that was stored in advance in storage unit 103 as the initial operating mode (S202).

Figure 6:
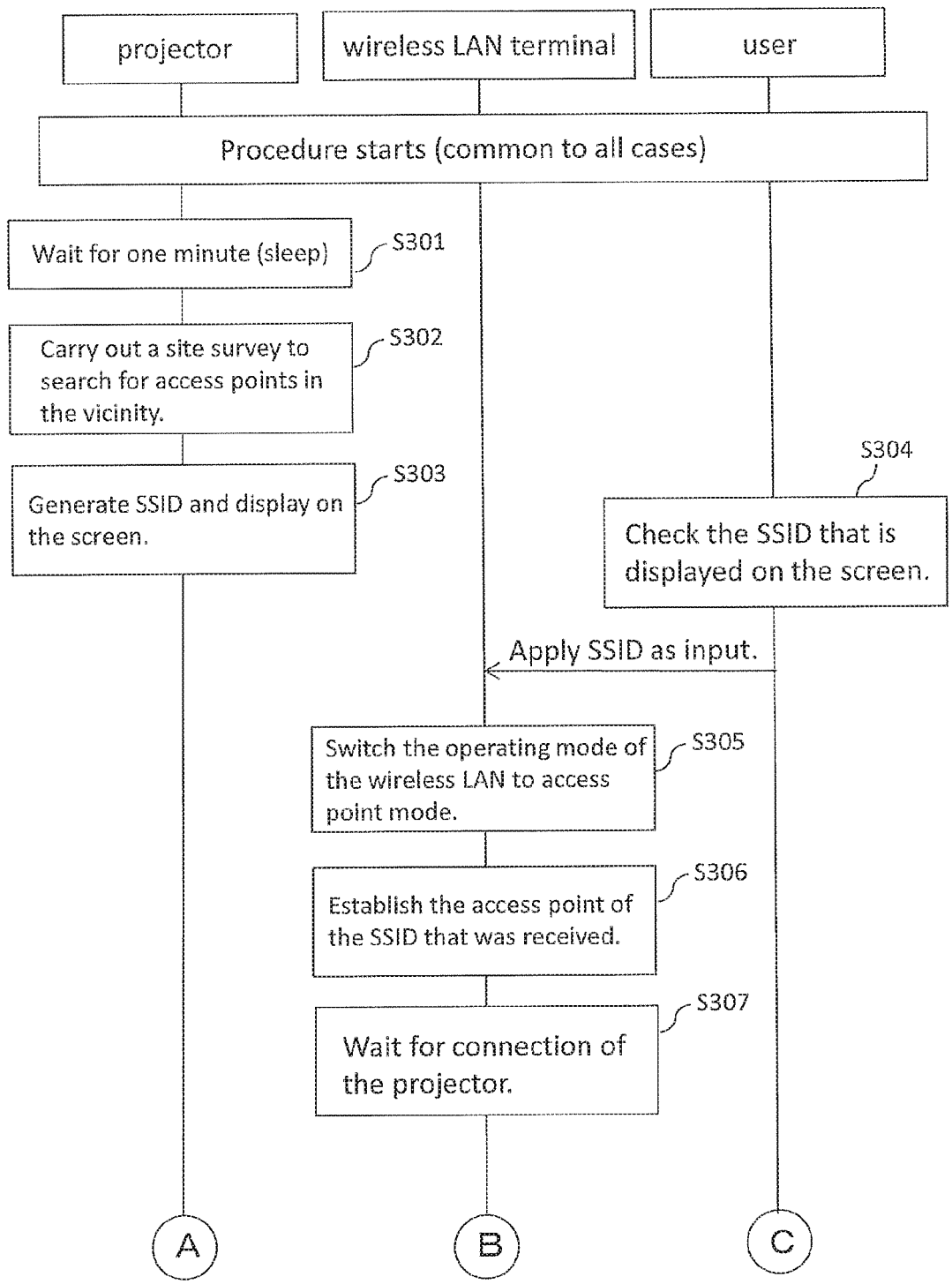
FIG. 6 is a sequence diagram showing the operation of an exemplary embodiment of the present invention.
Figure 7:
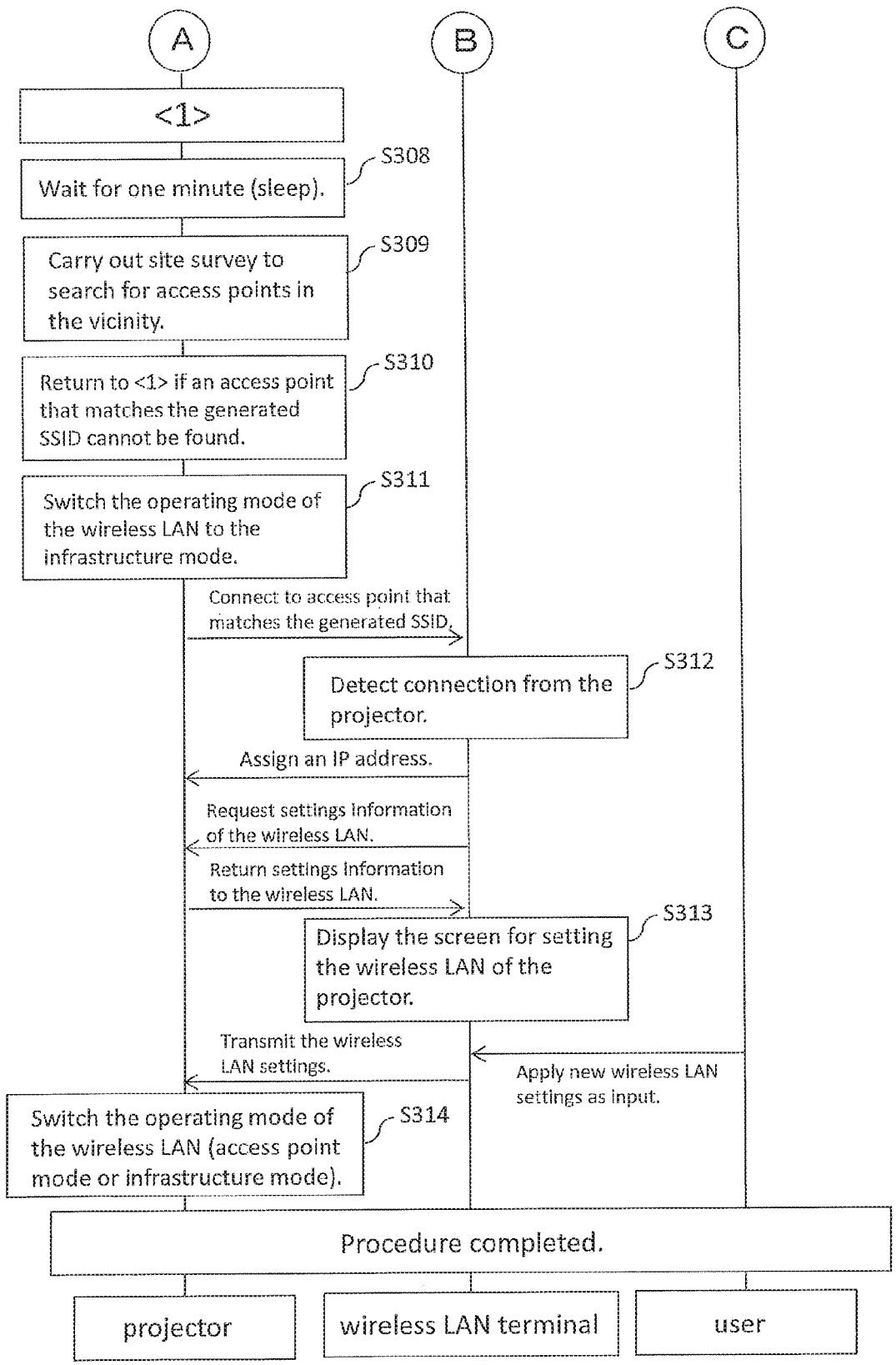
FIG. 7 is a sequence diagram showing the operation of an exemplary embodiment of the present invention.

After the operation shown in FIG. 4 or FIG. 5, the process transitions to the operation shown in FIG. 6 or FIG. 7.

In FIG. 6, projector 100 either has erroneous wireless LAN settings or is in the initial state and the wireless LAN path is therefore cut off. After a one-minute standby (sleep) (Step S301), projector 100 subsequently conducts a site survey by means of site survey processing unit 104c to search for access points in the vicinity (Step S302). The standby time interval is not limited to one minute and any necessary and sufficient time interval that can be guaranteed may be adopted.

SSID generation unit 104d next generates, as connection information, SSID that differs from the SSID of the access points of neighboring wireless LAN that were obtained by the site survey in Step S302, and picture signal generation unit 104e generates a picture signal that causes display on an OSD (On-Screen Display) of the SSID that was generated and displays the SSID on the screen that is the projection surface (Step S303). Regarding the generation of the SSID, an SSID that differs from the SSID of access points of neighboring wireless LAN can be realized by using its own MAC address. Alternatively, instead of displaying on an OSD, the SSID may also be displayed on a screen superposed on a display image.

The user checks the SSID that is displayed on the screen (Step S304) and enters the value as SSID to input unit 205 of wireless LAN terminal 200.

Wireless LAN terminal 200 switches the operating mode to the access point mode (Step S305), and access point functional unit 204*a* sets the SSID that was received as input by the user (Step S306) and waits for a connection from projector 100 (Step S307).

In projector 100, after a one-minute standby (sleep) (Step S308) following Step S303, a site survey is carried out by site survey processing unit 104*c* to search for neighboring access points (Step S309).

When, as a result of the site survey in Step S309, an access point is not found that matches the SSID that was generated in Step S303, the process returns to Step S308, and when an access point is found that matches the SSID that was generated in Step S303, the mode of the wireless LAN switches to the infrastructure mode (Step S311). Client functional unit 104*b* subsequently uses the security key of wireless LAN terminal 200 that is stored with the generated SSID to connect to wireless LAN terminal 200 that is the access point. At this time, the network settings of the projector are assumed to have DHCP (Dynamic Host Configuration Protocol).

When the connection of projector 100 is detected in wireless LAN terminal 200 (Step S312), access point functional unit 204*a* assigns an IP address to projector 100 and requests wireless LAN settings information that are necessary for setting the operating mode of the wireless LAN. Here, the verification of whether the newly connected wireless LAN client is projector 100 is carried out by means of the MAC address that is an ID unique to projector 100, but this verification may also be determined based on an ID unique to projector 100 other than the MAC address. The following settings are included as the wireless LAN settings information.

(1) The wireless LAN operating mode that is stored in storage unit 103 of the projector.

(2) If the operating mode of (1) is infrastructure, settings necessary for operating in the infrastructure mode that are stored in storage unit 103 of the projector (the SSID or security key of the access point that is the object of connection) and settings that are necessary to communicate by Internet protocol (whether to use or not use DHCP; and the IP address or subnet mask and gateway address if DHCP is not used).

(3) If the operating mode of (1) is infrastructure access point, settings that are necessary for operating in the access point mode that are stored in storage unit 103 of the projector (the SSID and security mode and security key of the access point) and settings necessary to communicate by Internet protocol (the IP address or subnet mask).

When wireless LAN terminal 200 acquires settings information of the wireless LAN that was transmitted by projector 100, display signal generation unit 204*c* generates an image signal that causes display on display unit 206 of a screen for setting the operating mode of the wireless LAN of projector 100 on the basis of the acquired wireless LAN settings information, whereby a screen is displayed on display unit 206 for setting the operating mode of the wireless LAN of projector 100 (Step S313). The form of selecting and inputting various settings can be proposed as the screen composition that is displayed, but no particular limitations apply.

The user that checks display unit 206 of wireless LAN terminal 200 performs input on input unit 205 to newly set the operating mode of the wireless LAN of projector 100, whereby wireless LAN terminal 200 transmits the new wireless LAN settings to projector 100.

In projector 100, the operating mode of the wireless LAN is switched in accordance with the new wireless LAN settings that were received (Step S314). The process next returns to Step S301. Subsequently, by means of the setting of the new operating mode in Step S314, projector 100 and wireless LAN terminal 200 enter a state of disconnection in the wireless LAN path, but when the settings of the new operating mode become necessary, the SSID that is displayed on the projection surface in Step S304 is applied as input to implement the same operation as described above.

In the present exemplary embodiment described hereinabove, projector 100 generates a unique SSID, and taking this display as a trigger, wireless LAN terminal 200 enters the access point mode and the displayed SSID is set.

After the SSID is displayed, projector 100 performs a search of the SSID that was displayed (generated), and in the event of discovering this SSID, switches the operating mode of the wireless LAN to the infrastructure mode and connects to wireless LAN terminal 200 that is an access point. In this way, the user can connect projector 100 and wireless LAN terminal 200 by a wireless LAN for any wireless LAN setting that is made to projector 100.

In the present exemplary embodiment, explanation regarded a case in which picture signal generation unit 104*e* of projector 100 displays SSID without alteration as connection information, but the SSID may also be displayed by an encoded value as the connection information and wireless LAN terminal 200 may have a decoding function. In this case, wireless LAN terminal 200 decodes the SSID upon input of the encoded SSID to wireless LAN terminal 200 and an operation similar to that described above is carried out. In the case of this type of configuration, the SSID is not directly displayed, and the security effect can therefore be improved.

In addition, picture signal generation unit 104*e* of projector 100 may display a unique SSID that was generated as connection information by a two-dimensional data code, and wireless LAN terminal 200 may be a component having an analysis function of two-dimensional data code. The adoption of a configuration of this type features effects such as enabling a reduction of the effort of applying SSID as input and improving the security effect because SSID is not directly displayed.

Second Exemplary Embodiment

The second exemplary embodiment of the present invention is next described.

In the first exemplary embodiment, the SSID that is set in wireless LAN terminal 200 is generated by projector 100, but in the present exemplary embodiment, an SSID for connection use that is determined in advance by the user is registered in storage unit 103 of projector 100 and storage unit 203 of wireless LAN terminal 200. As a result, SSID generation unit 104*d* and picture signal generation unit 104*e* shown in FIG. 3(*a*) are unnecessary. The configuration is otherwise the same as that of the first exemplary embodiment, and explanation of this exemplary embodiment is therefore described using the reference numbers of FIG. 2 and FIG. 3.

Figure 8:
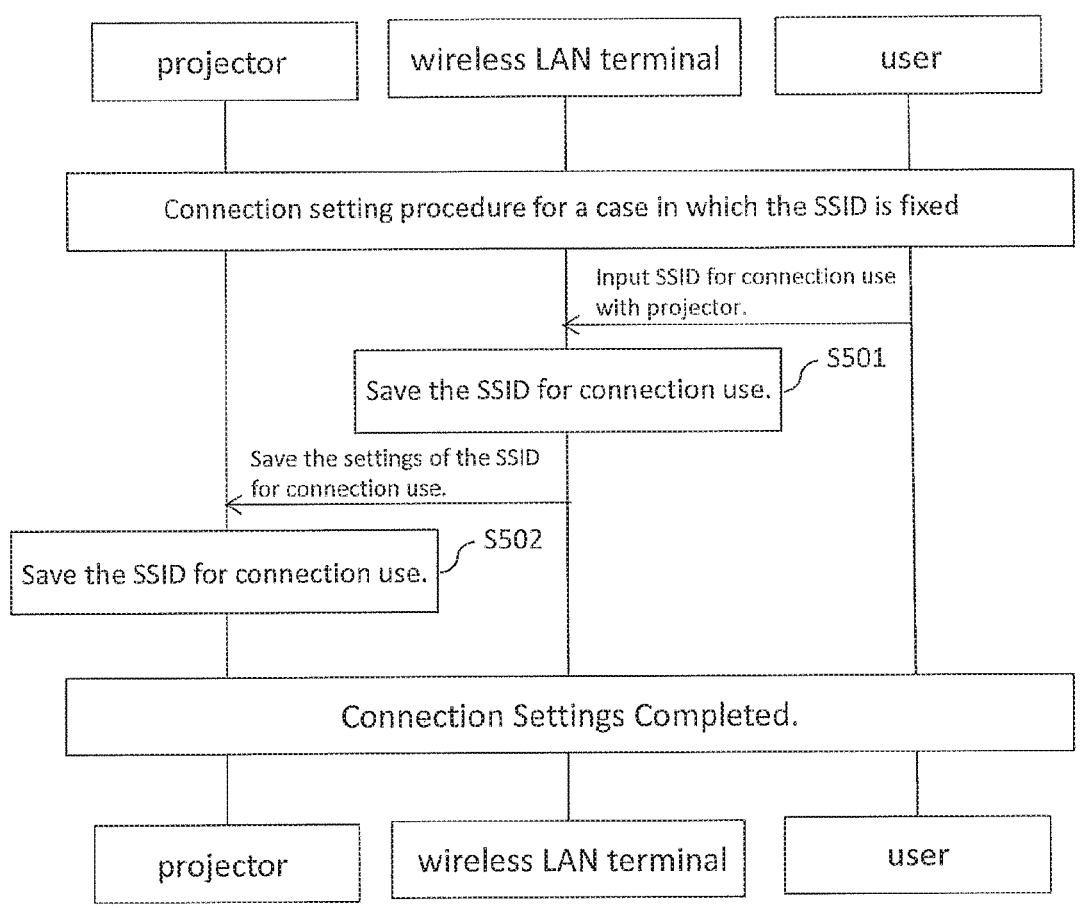
FIG. 8 is a sequence diagram showing the operation of an exemplary embodiment of the present invention.

FIG. 8 is a sequence diagram showing the registration procedure of SSID that the user has determined in advance.

When a SSID for connection use that was determined in advance by the user is applied to input unit 205 of wireless LAN terminal 200, the SSID for connection use is saved in storage unit 203 (Step S501) and is transmitted to projector 100. Projector 100 saves the SSID for connection use that was sent in storage unit 103 (Step S502).

Figure 9:
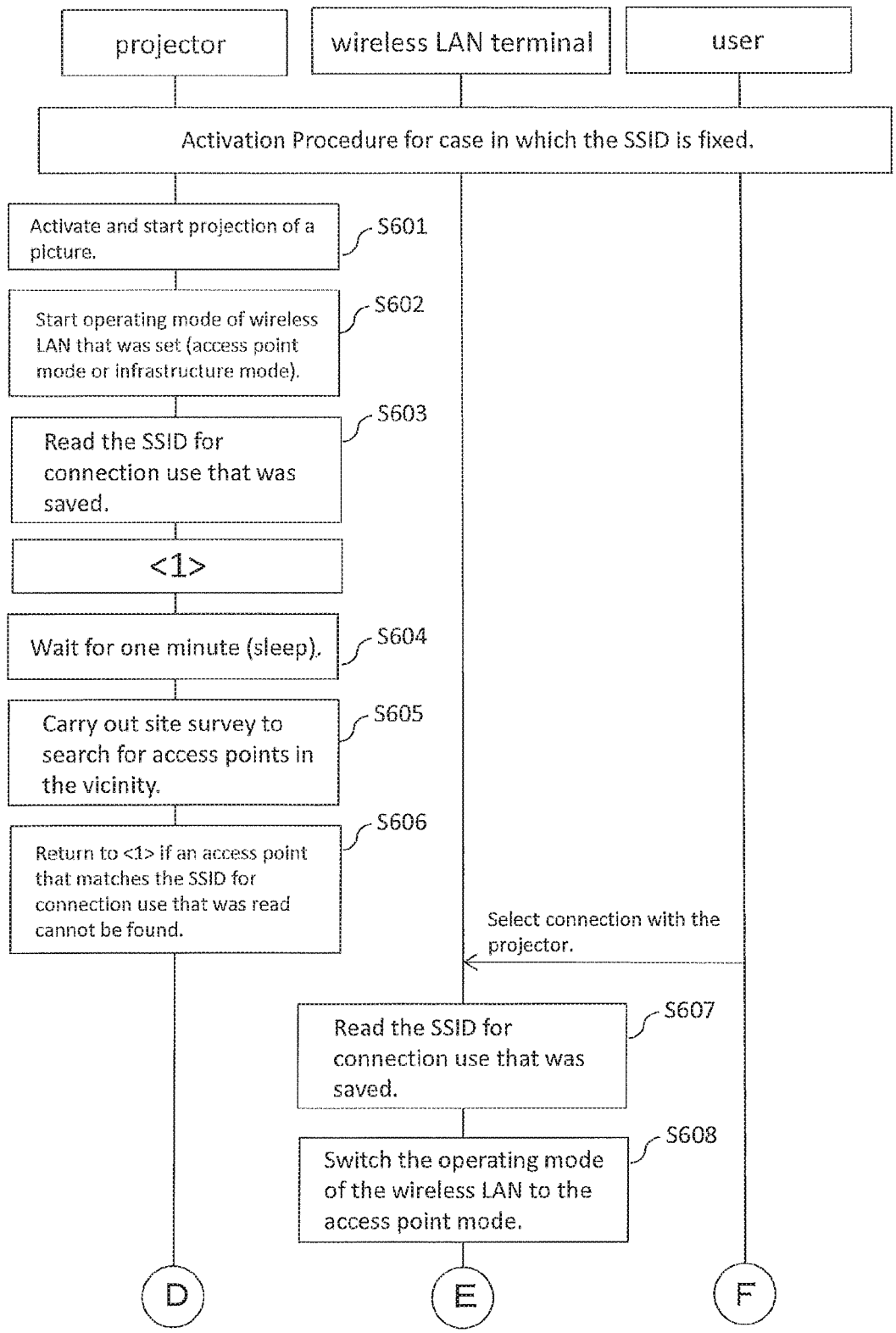
FIG. 9 is a sequence diagram showing the operation of an exemplary embodiment of the present invention.
Figure 10:
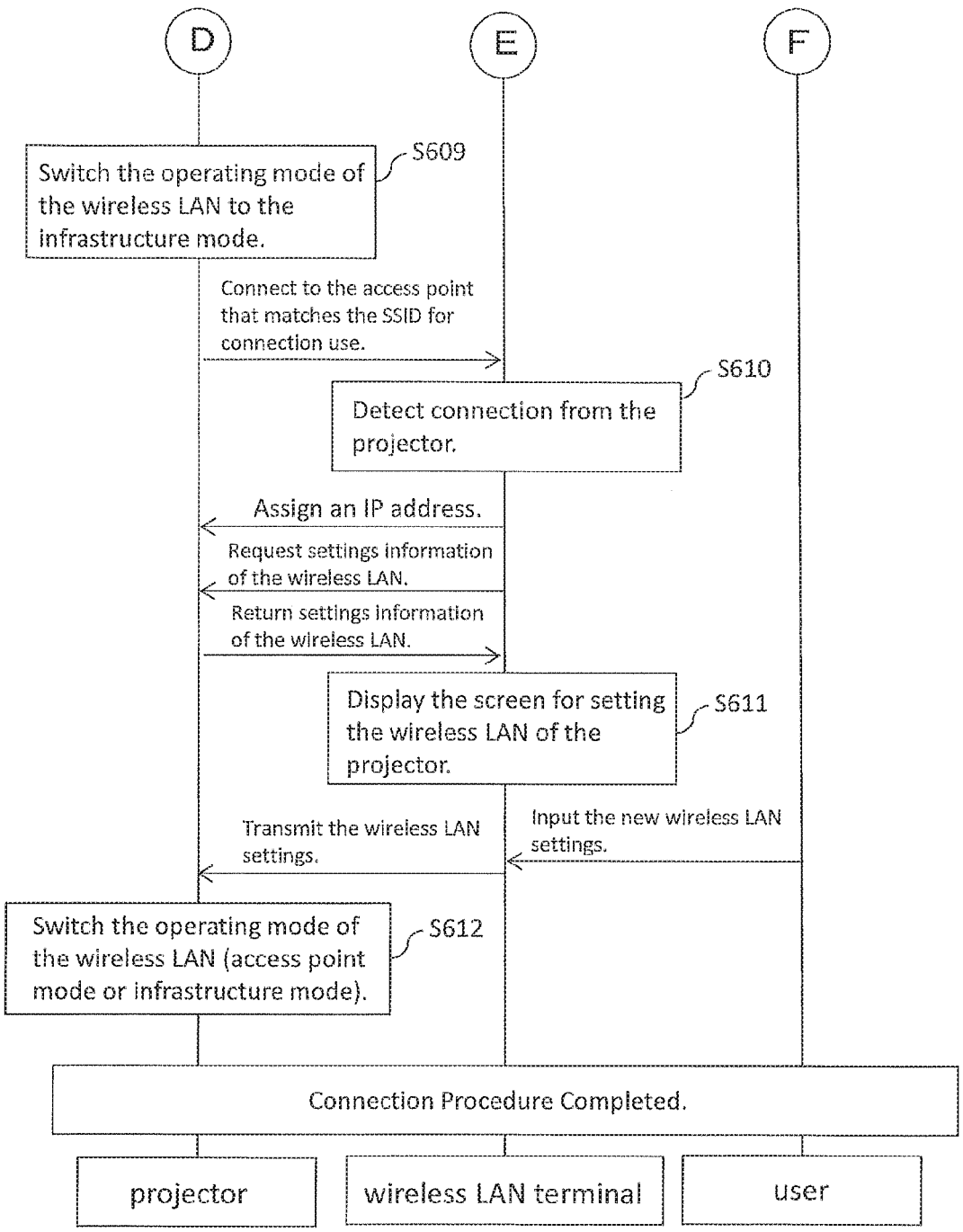
FIG. 10 is a sequence diagram showing the operation of an exemplary embodiment of the present invention.

FIGS. 9 and 10 are sequence diagrams that show the operations at the time of activation of a projection system.

As described hereinabove, when the power supply is turned ON and the activated state entered, projector 100 that has registered SSID for connection use starts the projection of a picture (Step S601). Here, the picture is an initial time projection picture that has been stored in storage unit 103 in advance. Projector 100 subsequently starts operation of the wireless LAN in the operating mode that was stored in advance as the initial operating mode in storage unit 103 (S602).

Projector 100 next reads the SSID for connection use that is saved in storage unit 103 (Step S603), and after one-minute standby (sleep) (Step S604), carries out a site survey by means of site survey processing unit 104c to search for access points in the vicinity (Step S605).

If, as a result of the site survey in Step S605, an access point is not found that matches with the SSID for connection use that was read in Step S603, the process returns to Step S604 (Step S606).

On the other hand, when input unit 205 of wireless LAN terminal 200 receives input realized by the user indicating connection with projector 100, wireless LAN terminal 200 reads the SSID for connection use that is saved in storage unit 203 (Step S607) and switches the operating mode to the access point mode (Step S608), and access point functional unit 204a sets the SSID for connection use and waits for connection from projector 100.

If an access point is found in Step S606 that matches the SSID for connection use that was read in Step S603, projector 100 switches the mode of the wireless LAN to the infrastructure mode (Step S609). Client functional unit 104b subsequently connects to the access point (wireless LAN terminal 200). At this time, the settings of the projector network are made "DHCP present."

In wireless LAN terminal 200, when the connection of projector 100 has been detected (Step S610), access point functional unit 204a assigns an IP address to projector 100 to request the setting information of the wireless LAN that is required for setting the operating mode of the wireless LAN. Here, the verification that the wireless LAN client that connects is projector 100 is carried out by means of the MAC address that is ID unique to projector 100, but the determination may be made based on an ID unique to projector 100 other than the MAC address. When wireless LAN terminal 200 acquires the setting information of the wireless LAN that was transmitted by projector 100, display signal generation unit 204c generates an image signal for bringing about the display on display unit 206 of a screen for setting the operating mode of the wireless LAN of projector 100 on the basis of the acquired wireless LAN setting information, whereby a screen for setting the operating mode of the wireless LAN of projector 100 is displayed on display unit 206 (Step S611). A form of selecting and inputting various settings can be offered as the screen configuration that is displayed, but no particular limitations apply.

The user, having verified display unit 206 of wireless LAN terminal 200, carries out input to input unit 205 for newly setting the operating mode of the wireless LAN of projector 100, whereby wireless LAN terminal 200 transmits new wireless LAN settings to projector 100.

In projector 100, the operating mode of wireless LAN is switched in accordance with the new wireless LAN settings that were received (Step S612). The process subsequently returns to Step S604. Projector 100 and wireless LAN terminal 200 enter a state of not being connected on a wireless LAN path by means of the settings of the new operating mode in Step S612, but by the implementation of the same operation as described above, projector 100 and wireless LAN terminal 200 are connected on a wireless LAN path and a screen is displayed on display unit 206 of wireless LAN terminal 200 for setting the operating mode of the wireless LAN of projector 100. When settings of a new operating mode become necessary, the user performs input to input unit 205 of wireless LAN terminal 200.

In the present exemplary embodiment described hereinabove, rather than dynamically generating a unique SSID, SSID that has been determined beforehand is registered in a projector and wireless LAN terminal, whereby the need for the projector to display the SSID is eliminated. As a result, the inconvenience of applying the SSID as input for each connection can be eliminated. In addition, an enhanced security effect is obtained because the SSID is not displayed. Still further, the SSID is no longer superposed on the projected image and the projection of the picture is not obstructed.

EXPLANATION OF REFERENCE NUMBERS

100 projector
101, 201 antenna
102, 202 wireless communication processing unit
103, 203 storage unit
104, 204 control unit
105 image processing unit
106 drive unit
107 illumination optical system
108 image forming unit
109 projection optical system
200 wireless LAN terminal
110 projection light
205 input unit
206 display unit
300 screen

What is claimed is:

1. A wireless local area network (LAN) connection method of a wireless LAN terminal and a projector that is configured to operate as a wireless LAN access point apparatus or as a client apparatus, the wireless LAN connection method comprising:

said projector projecting connection information that indicates a service set identifier (SSID);

said wireless LAN terminal receiving, as input, said connection information in a provided input unit, and further, operating as an access point apparatus;

said projector detecting, by a site survey, said wireless LAN terminal that is operating as the access point apparatus; and said projector connecting, as the client apparatus, to said wireless LAN terminal.

2. The wireless LAN connection method as set forth in claim 1, wherein said connection information includes one of the SSID, information in which the SSID is encoded, and a form in which the SSID is represented by a two-dimensional data code.

3. The wireless LAN connection method as set forth in claim 2, wherein said SSID is generated by said projector.

4. The wireless LAN connection method as set forth in claim 2, wherein said SSID is determined in advance.

5. The wireless LAN connection method as set forth in claim 1, wherein said SSID comprises a unique SSID that differs from an SSID of access points in a vicinity that are detected by said site survey.

6. The wireless LAN connection method as set forth in claim 1, wherein:
   said projector sends to said wireless LAN terminal wireless LAN settings information that is necessary for setting an operating mode of a wireless LAN;
   said wireless LAN terminal sends to said projector new wireless LAN settings that accord with said wireless LAN settings information; and
   said projector switches the operating mode of the wireless LAN according to said new wireless LAN settings.

7. The wireless LAN connection method as set forth in claim 1, wherein the site survey searches neighboring access points of a wireless LAN to detect said wireless LAN terminal.

8. A wireless local area network (LAN) system that includes a projection system including a projector and a wireless LAN terminal that is configured to operate as a wireless LAN access point apparatus or as a client apparatus, wherein:
   said projector is provided with:
      a picture signal generation unit that generates a picture signal that displays connection information that indicates a service set identifier (SSID); and
      a site survey processing unit that searches for access points in a vicinity,
   said wireless LAN terminal is provided with an input unit;
   said wireless LAN terminal, upon receiving the connection information as input in the input unit, operates as an access point apparatus of the SSID indicated in the connection information; and
   said projector, upon detecting said wireless LAN terminal that is operating as the access point apparatus of the SSID by said site survey processing unit, connects to said wireless LAN terminal, as an other client apparatus.

9. The wireless LAN, system as set forth in claim 8, wherein said connection information includes one of the SSID, information in which the SSID is encoded, and a form that represents the SSID by a two-dimensional data code.

10. The wireless LAN system as set forth in claim 9, wherein said SSID is generated by said projector.

11. The wireless LAN system as set forth in claim 9, wherein said SSID is determined in advance.

12. The wireless LAN system as set forth in claim 8, wherein said SSID comprises a unique SSID that differs from an SSID of access points in the vicinity that have been detected by said site survey processing unit.

13. The wireless LAN system as set forth in claim 8, wherein:
   said projector sends to said wireless LAN terminal wireless LAN settings information that is necessary for setting an operating mode of the wireless LAN;
   said wireless LAN terminal sends to said projector new wireless LAN settings that accord with said wireless LAN settings information; and
   said projector switches the operating mode of the wireless LAN according to said new wireless LAN settings.

14. The wireless LAN system as set forth in claim 8, wherein the site survey processing unit searches for access points in the vicinity such that the site survey processing unit searches neighboring access points of a wireless LAN to detect said wireless LAN terminal.

15. A projector that, together with a wireless local area network (LAN) terminal that is configured to operate as a wireless LAN access point apparatus or as a client apparatus, constitutes a projection system, the projector comprising:
   a picture signal generation unit that generates a picture signal that displays connection information that indicates a service set identifier (SSID); and
   a site survey processing unit that searches for access points in a vicinity,
   wherein, upon detection of said wireless LAN terminal that is operating as the wireless LAN access point apparatus by said site survey processing unit, said projector connects with said wireless LAN terminal as an other client apparatus.

16. The projector as set forth in claim 15, wherein said connection information includes one of the SSID, information in which the SSID is encoded, and a form in which the SSID is represented by a two-dimensional data code.

17. The projector as set forth in claim 16, wherein said SSID is generated by said projector.

18. The projector as set forth in claim 16, wherein said SSID is determined in advance.

19. The projector as set forth in claim 15, wherein said SSID comprises a unique SSID that differs from an SSID of access points in the vicinity that were detected by said site survey processing unit.

20. The projector as set forth in claim 15, wherein said projector, after having sent to said wireless LAN terminal wireless IAN settings information that is necessary for setting the operating mode of the wireless LAN and upon receiving new wireless LAN settings that accord with said wireless LAN settings information from said wireless LAN terminal, switches the operating mode of the wireless LAN according to said new wireless LAN settings.

* * * * *